US012659410B2

(12) United States Patent
Martin

(10) Patent No.: US 12,659,410 B2
(45) Date of Patent: Jun. 16, 2026

(54) ALARM TRIGGERED COMMUNICATIONS

(71) Applicant: Hill-Rom Services, Inc., Batesville, IN (US)

(72) Inventor: Joel Centelles Martin, Barcelona (ES)

(73) Assignee: Hill-Rom Services, Inc., Batesville, IN (US)

( * ) Notice: Subject to any disclaimer, the term of this patent is extended or adjusted under 35 U.S.C. 154(b) by 417 days.

(21) Appl. No.: 18/362,300

(22) Filed: Jul. 31, 2023

(65) Prior Publication Data

US 2024/0048657 A1 Feb. 8, 2024

Related U.S. Application Data

(60) Provisional application No. 63/370,571, filed on Aug. 5, 2022.

(51) Int. Cl.
| *H04W 76/50* | (2018.01) |
| *H04M 3/56* | (2006.01) |
| *H04W 64/00* | (2009.01) |
| *H04W 76/40* | (2018.01) |

(52) U.S. Cl.
CPC ......... *H04M 3/566* (2013.01); *H04W 64/006* (2013.01); *H04W 76/40* (2018.02); *H04W 76/50* (2018.02)

(58) Field of Classification Search
CPC .................................................... H04M 3/566
USPC ....................................................... 455/404.2
See application file for complete search history.

(56) References Cited

U.S. PATENT DOCUMENTS

| | | | | |
|---|---|---|---|---|
| 7,292,135 B2 * | 11/2007 | Bixler | ................... | A61B 5/0002 |
| | | | | 340/286.07 |
| 8,717,181 B2 * | 5/2014 | Tallent | ................. | G08B 25/008 |
| | | | | 5/940 |
| 10,770,177 B2 * | 9/2020 | Zuckerman | .......... | G08B 27/001 |
| 11,020,064 B2 * | 6/2021 | Fountaine | ............... | G10L 25/66 |
| 11,172,892 B2 * | 11/2021 | Zerhusen | ............. | A61B 5/6892 |
| 11,257,588 B2 * | 2/2022 | Faulks | ................. | G08B 27/005 |
| 11,322,263 B2 * | 5/2022 | Barkol | .................. | G16H 80/00 |
| 2005/0148890 A1 * | 7/2005 | Hastings | ................ | G16H 40/67 |
| | | | | 600/509 |
| 2017/0201475 A1 * | 7/2017 | Gupta | ................. | G06F 3/04817 |
| 2020/0279658 A1 * | 9/2020 | Rao | ....................... | H04L 51/046 |

FOREIGN PATENT DOCUMENTS

| | | |
|---|---|---|
| CA | 2957237 A1 | 8/2018 |
| CN | 108538402 A | 9/2018 |
| JP | 2021159332 A | 10/2021 |
| JP | 2021159335 A | 10/2021 |

* cited by examiner

*Primary Examiner* — Qutbuddin Ghulamali
(74) *Attorney, Agent, or Firm* — Merchant & Gould P.C.

(57) ABSTRACT

A system for providing alarm triggered communications is described. The system receives a notification regarding an alarm condition, and opens a communications channel based on the alarm condition. The communications channel joins together communications badges worn by caregivers in a clinical care environment. The system closes the communications channel when the alarm condition is resolved.

18 Claims, 7 Drawing Sheets

500

502
Monitor Alarms

No

504
Intervention Required?

Yes

506
Open Communications Channel

No

508
Alarm Resolved?

Yes

510
Close Communications Channel

ALARM TRIGGERED COMMUNICATIONS

BACKGROUND

Caregivers, such as nurses and other healthcare professionals, are typically assigned to multiple patients in a clinical care environment such as a hospital. Various alerts and nurse calls generated by the patients are communicated to the caregivers. In some instances, the alerts and nurse calls are categorized as normal or high priority. Sometimes an alert is escalated to a secondary caregiver when left unanswered for more than a threshold amount of time.

When an alarm is triggered, an alert can be sent to a caregiver notifying them of the need to resolve the alarm. However, there is no communication channel that is opened between relevant caregivers for responding to the alarm. Additionally, making a voice call requires an acceptance from a receiving party which typically happens after several seconds have passed, and in some instances, the receiving party may not notice an invitation to accept a voice call, causing even further delay. Also, in conference calls between multiple caregivers, several caregivers may talk at the same time causing overlap and loss of useful information. Such delays and distractions can interfere with response times to medical emergencies.

SUMMARY

In general terms, the present disclosure relates to alarm triggered communications. In one possible configuration, a communications channel is opened based on an alarm condition, and the communications channel is closed when the alarm condition is resolved. Various aspects are described in this disclosure, which include, but are not limited to, the following aspects.

One aspect relates to a system for providing alarm triggered communications, the system comprising: at least one processing device; and a memory device storing instructions which, when executed by the at least one processing device, cause the at least one processing device to: receive a notification regarding an alarm condition; open a communications channel based on the alarm condition, the communications channel joining together communications badges worn by caregivers in a clinical care environment; and close the communications channel when the alarm condition is resolved.

Another aspect relates to a method of providing alarm triggered communications, the method comprising: receiving a notification regarding an alarm condition; opening a communications channel based on the alarm condition, the communications channel joining together communications badges worn by caregivers in a clinical care environment; and closing the communications channel when the alarm condition is resolved.

Another aspect relates to a non-transitory computer readable storage medium storing instructions, which when executed by a computing device, cause the computing device to: receive a notification regarding an alarm condition; open a communications channel based on the alarm condition, the communications channel joining together communications badges worn by caregivers in a clinical care environment; and close the communications channel when the alarm condition is resolved.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
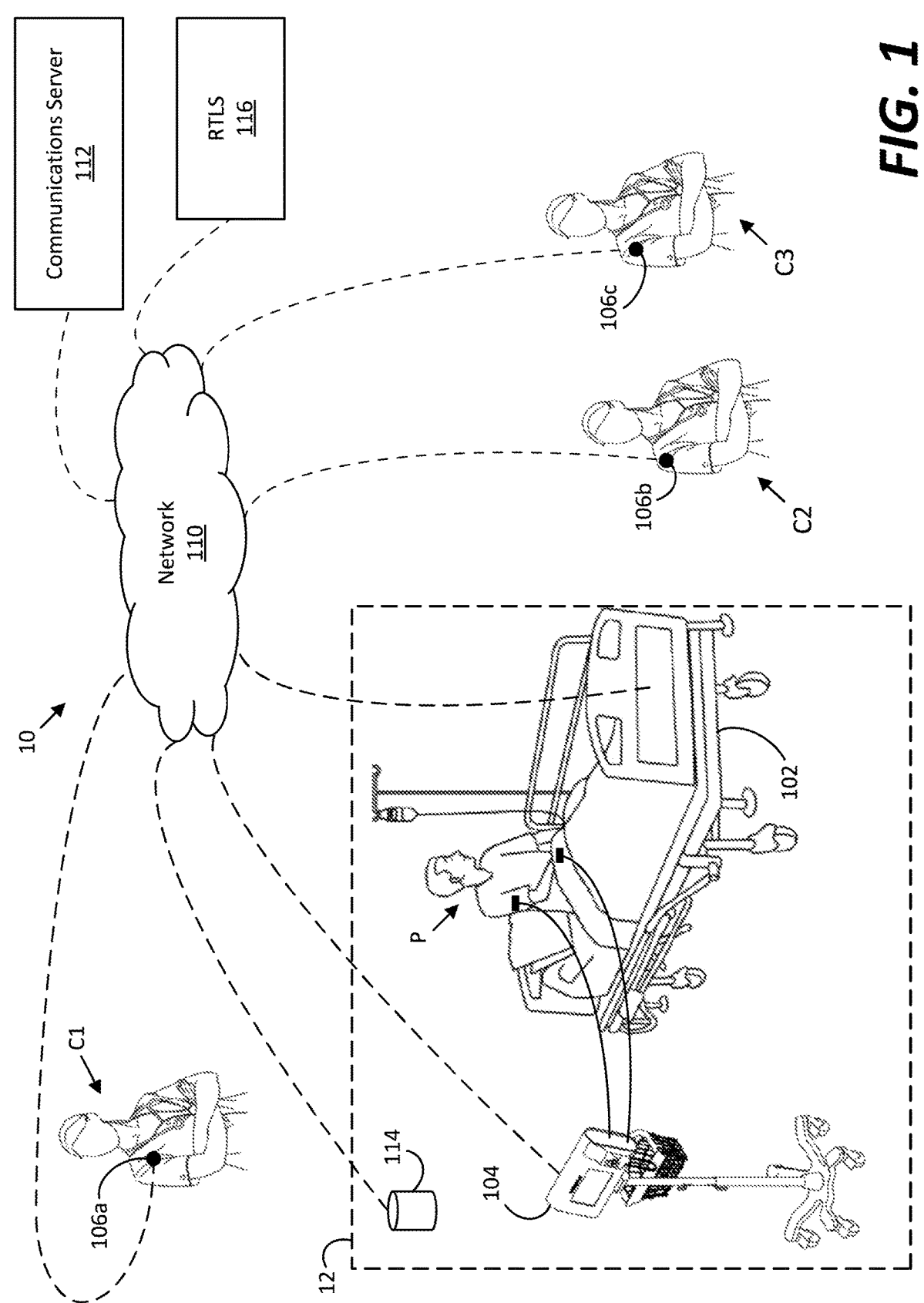
FIG. 1 illustrates an example of a clinical care environment where a communications channel is automatically opened based on an alarm condition inside a patient environment.

FIG. 1 illustrates an example of a clinical care environment 10, in which a communications channel is automatically opened when an alarm condition is triggered inside a patient environment 12. Caregivers C are automatically joined to the communications channel, allowing the caregivers to instantly share information while the alarm condition is ongoing inside the patient environment 12. When the alarm condition is resolved inside the patient environment 12, the communications channel between the caregivers C is automatically terminated.

The clinical care environment 10 can be located within a healthcare facility such as a hospital, a nursing home, a rehabilitation center, a long term care facility, and the like. As shown in FIG. 1, a patient P is located in the patient environment 12, which can include a room or other designated area within the clinical care environment 10. For example, the patient environment 12 can include a patient room, a department (e.g., emergency department), clinic, ward, or other area within the clinical care environment 10. In this illustrative example, the caregivers C are located outside of the patient environment 12 in the clinical care environment 10.

As shown in FIG. 1, the patient P is supported on a patient support apparatus 102 inside the patient environment 12. In some examples, the patient support apparatus 102 is a hospital bed, or similar type of apparatus. In some instances, the patient support apparatus 102 includes aspects of the patient support apparatuses described in U.S. Pat. No. 8,717, 181 B2, entitled BED EXIT ALERT SILENCE WITH AUTOMATIC RE-ENABLE, issued on May 6, 2014, and U.S. Pat. No. 11,172,892 B2, entitled PATIENT SUPPORT APPARATUS HAVING VITAL SIGNS MONITORING AND ALERTING, issued on Nov. 16, 2021, the disclosures of which are hereby incorporated by reference in their entireties.

The patient support apparatus 102 includes one or more sensors that measure one or more physiological parameters of the patient P. For example, the one or more sensors can measure one or more vital signs such as heart rate and respiration rate. In further examples, the one or more sensors can measure patient weight, patient motion, and patient activity level. In further examples, the one or more sensors can detect patient exit and fall risk.

The patient support apparatus 102 includes an alarm system that generates alarms based on data obtained from the one or more sensors included on the patient support apparatus. As an illustrative example, when the patient P has an elevated risk for patient fall, the alarm system can trigger an alarm when the one or more sensors detect the patient P is about to exit the patient support apparatus 102 and a caregiver C is not present inside the patient environment 12. As a further illustrative example, the alarm system of the patient support apparatus 102 can trigger an alarm when the one or more sensors detect changes in one or more vital signs such as respiration rate and/or heart rate that indicate health deterioration. Additional types of alarms that can be triggered by the alarm system of the patient support apparatus 102 are contemplated. The alarms generated on or by the patient support apparatus 102 can be transmitted from the patient environment 12 to a communications server 112 via a network 110.

As further shown in FIG. 1, the patient P is connected to a monitoring device 104 positioned next to the patient support apparatus 102 inside the patient environment 12. The monitoring device 104 includes one or more sensors that can measure physiological parameters of the patient such as blood oxygen saturation, body temperature, blood pressure, pulse/heart rate, respiration rate, electrocardiogram (EKG), and the like. In some examples, the monitoring device 104 is a spot monitor that continuously monitors a health status of the patient P.

The monitoring device 104 can include an alarm system that generates alarms based on data obtained from the one or more sensors included on the monitoring device. As an illustrative example, when an individual physiological parameter (e.g., pulse rate) falls outside of a healthy range, the alarm system of the monitoring device 104 triggers an alarm. As another illustrative example, the monitoring device 104 can compute an early warning score based on a combination of the physiological parameters. When the early warning score exceeds a predetermined threshold, the alarm system of the monitoring device 104 triggers an alarm requesting immediate intervention by the caregivers C in the clinical care environment 10. The alarms generated on or by the monitoring device 104 can be transmitted from the patient environment 12 to the communications server 112 via the network 110.

The patient environment 12 further includes a fixed reference point 114 that can act as a beacon for detecting wireless signals from the patient P and/or the caregivers C inside the patient environment 12. The fixed reference point 114 transmits the wireless signals detected from the patient P and/or the caregivers C to a real-time locating system (RTLS) 116 via the network 110. The RTLS 116 uses the wireless signals received from the fixed reference point 114 to determine whether the patient P and the caregivers C are located in the patient environment 12. While a single fixed reference point is shown in FIG. 1, fixed reference points 114 can be distributed throughout the clinical care environment 10 allowing the RTLS 116 to track the locations of the patient P and the caregivers C in the clinical care environment 10.

As an illustrative example, the fixed reference point 114 can detect wireless signals from tags worn by the patient P and/or by the caregivers C such as radio frequency (RF) signals, optical (e.g., infrared) signals, or acoustic (e.g., ultrasound) signals. In a further illustrative example, the fixed reference point 114 can detect Bluetooth signals emitted by devices carried by the caregivers C such as communications badges 106. In some instances, the tags that are detectable by the fixed reference point 114 are attached to the communications badges 106 (see tag 412 shown in FIG. 4, which will be described in more detail below).

The RTLS 116 uses the wireless signals detected by the fixed reference point 114 to determine whether a caregiver C has entered the patient environment 12, or whether the patient P has absconded from the patient environment 12. In instances when the patient P absconds from the patient environment 12 without authorization, the RTLS 116 triggers an alarm.

Additional types of devices and systems can be positioned inside the patient environment 12 to monitor a status of the patient P. These additional types of devices can include or otherwise be connected to alarm systems that trigger additional types of alarms indicating a need for immediate intervention by the caregivers C. These additional types of devices can include video cameras that monitor the patient P inside the patient environment 12.

The patient support apparatus 102, the monitoring device 104, and the fixed reference point 114 are each connected to the network 110. When an alarm is triggered by data collected from any one of these devices inside the patient environment 12, the alarm can be communicated to the communications server 112 via the network 110.

The communications server 112 routes alerts and notifications based on the alarms triggered inside the patient environment 12 to communications badges 106 worn by the caregivers C. Additionally, the communications server 112 opens a communications channel on the communications badges 106 allowing the caregivers C to instantly communicate with one another while an alarm condition is ongoing in the patient environment 12.

In the example illustrated in FIG. 1, the clinical care environment 10 includes a first caregiver C1, a second caregiver C2, and a third caregiver C3. The first, second, and third caregivers C1, C2, C3 that are illustrated in FIG. 1 are provided by way of illustrative example, and it is contemplated that the number of caregivers in the clinical care environment 10 can be significantly greater than the three caregivers shown in FIG. 1.

Each caregiver C wears or otherwise carries a communications badge 106. For example, the communications badges 106 can be clipped or pinned onto the clothing worn by the caregivers, or can be attached to a lanyard or other type of accessory worn by the caregivers. The communications badges 106 allow hands-free voice communications between the caregivers. Also, the communications badges 106 receive secure text messages and alert notifications, allow the caregivers C to broadcast voice and text messages to groups of caregivers in the clinical care environment 10, initiate and join conference calls, and schedule reminders. In some examples, the communications badges 106 can include smartphones, tablet computers, and other similar types of portable computing devices equipped with telecommunications. The communications server 112 manages the data and voice communications, which are communicated over the network 110, between the communications badges 106 worn by the caregivers.

The network 110 facilitates data communication between the devices inside the patient environment 12, including the patient support apparatus 102, the monitoring device 104, the fixed reference point 114, and between the communications server 112 and the RTLS 116, which can be located outside of the patient environment. Additionally, the network 110 facilitates data communication between the communications badges 106.

The network 110 includes computing devices and connections between the computing devices to enable data communication among the computing devices. The network 110 can include routers and other networking devices. The network 110 can include any type of wired or wireless connection, or any combinations thereof. Examples of wireless connections can include cellular network connections such as 4G or 5G. Wireless connections in the network 110 can further include Bluetooth, Wi-Fi, and other similar types of wireless technologies.

Figure 2:
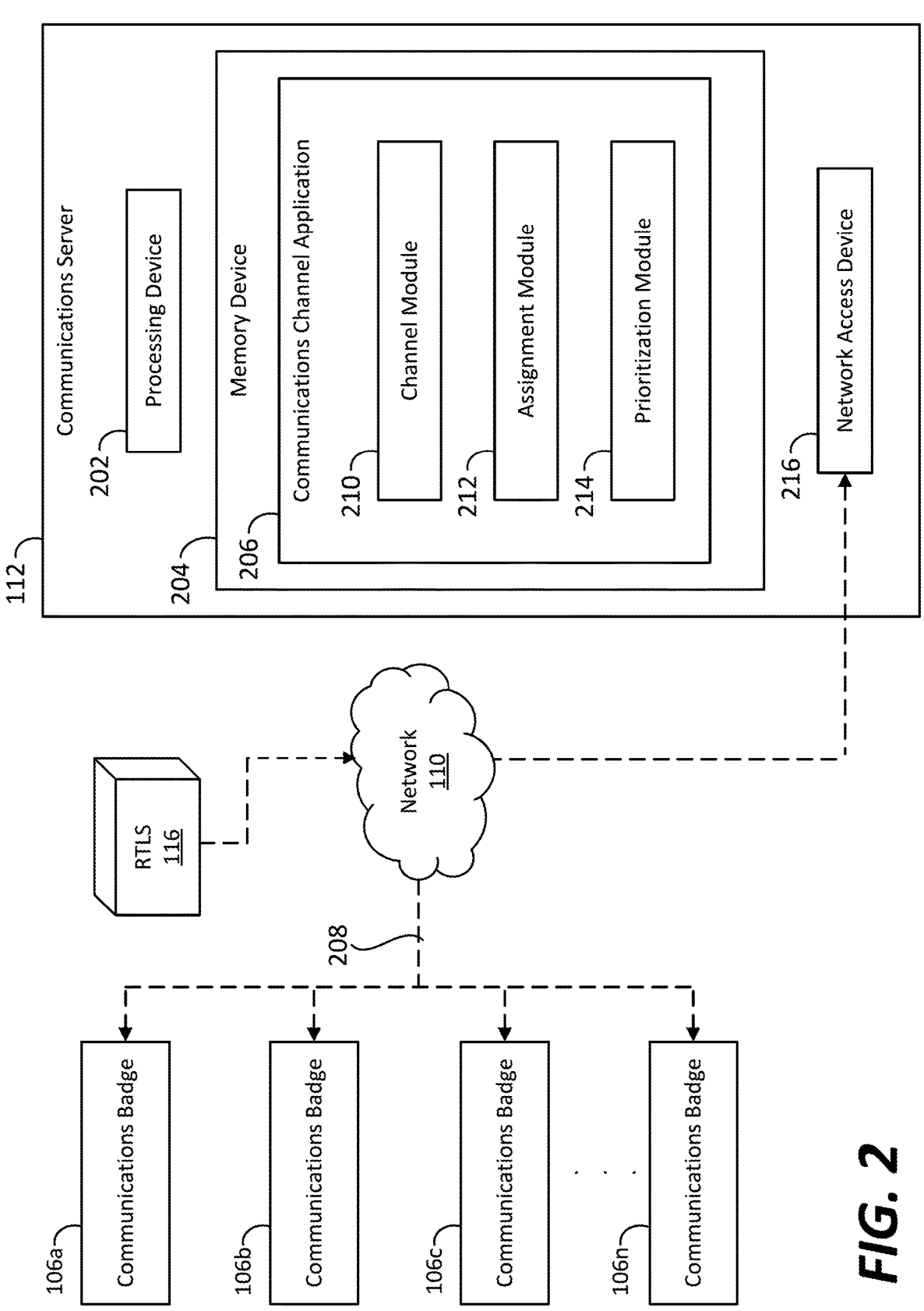
FIG. 2 schematically illustrates an example of a communications server that opens the communications channel in the clinical care environment of FIG. 1.

FIG. 2 schematically illustrates an example of the communications server 112 in the clinical care environment 10. The communications server 112 is in communication over the network 110 with the communications badges 106 worn by the caregivers C.

The communications server 112 includes at least one processing device 202. The at least one processing device 202 is an example of a processing unit such as a central processing unit (CPU). The at least one processing device 202 can include one or more central processing units (CPU). In further examples, the at least one processing device 202 includes digital signal processors, field-programmable gate arrays, and similar electronic computing circuits.

The communications server 112 includes a memory device 204 that stores data and instructions for execution by the at least one processing device 202. As shown in FIG. 2, the memory device 204 stores a communications channel application 206, which will be described in more detail below. The memory device 204 includes computer readable media, including any media accessible by the communications server 112. For example, computer readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media can include random access memory, read only memory, electrically erasable programmable read only memory, flash memory, and other memory technology, including any medium that can be used to store information that can be accessed by the communications server 112. The computer readable storage media is non-transitory.

Computer readable communication media embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are within the scope of computer readable media.

The communications server 112 further includes a network access device 216. The network access device 216 operates to communicate with other computing devices over the network 110 such as the communications badges 106 worn by the caregivers C. Examples of the network access device 216 include wired network interfaces and wireless network interfaces.

As shown in FIG. 2, the communications channel application 206 opens a communications channel 208 between the communications badges 106a-106n worn by the caregivers C via the network 110. The communications channel application 206 includes several modules or sub-applications such as a channel module 210, an assignment module 212, and a prioritization module 214. Each of these modules will now be described in more detail.

The channel module 210 opens the communications channel 208 based on an alarm condition detected in the patient environment 12. As described above, the alarm condition is detected by devices located in the patient environment 12, including the patient support apparatus 102, the monitoring device 104, and/or the fixed reference point 114, and the alarm condition is communicated to the communications server 112 via the network 110.

The channel module 210 determines whether to open the communications channel 208 based on a type or severity of the alarm condition detected in the patient environment 12. The channel module 210 does not open the communications channel 208 for all alarms triggered in the patient environment 12. Instead, the channel module 210 opens the communications channel 208 only for critical alarms that require immediate intervention by the caregivers.

As an illustrative example, the channel module 210 opens the communications channel 208 between the communications badges 106a-106n when the patient P has a high risk for patient fall, the patient support apparatus 102 detects that the patient P is about to exit the patient support apparatus 102, and the RTLS 116 detects based on data received from the fixed reference point 114 that a caregiver C is not present inside the patient environment 12.

As another illustrative example, the channel module 210 opens the communications channel 208 between the communications badges 106a-106n when the RTLS 116 detects based on data received from the fixed reference point 114 that the patient P has absconded from the patient environment 12 without authorization or prior approval.

As a further illustrative example, the channel module 210 opens the communications channel 208 between the communications badges 106a-10n when the monitoring device 104 detects the patient P is experiencing a severe health event such as cardiac arrest. As another example, the channel module 210 does not open the communications channel 208 between the communications badges 106a-106n when the monitoring device 104 detects that a vital sign of the patient P is outside of a normal range, but is not indicative of a severe health event.

The assignment module 212 joins the caregivers C to the communications channel 208 based on the alarm condition detected in the patient environment 12. In some examples, the assignment module 212 joins the caregivers C to the communications channel 208 without providing an option for the caregivers C to accept or decline an invitation to join the communications channel 208. Instead, the assignment module 212 automatically joins caregivers C to the communications channel 208 without requiring their consent. This can eliminate delays caused by requiring a caregiver to accept an invitation to join the communications channel 208, such as when the invitation is not accepted until several seconds have passed. This can especially reduce delays that result from a caregiver not noticing an invitation to join the communications channel 208, such that the caregiver inadvertently fails to accept the invitation to join.

The assignment module 212 determines which caregivers C to add to the communications channel 208. As an illustrative example, the assignment module 212 adds all caregivers who are assigned to the patient environment 12 when the clinical care environment 10 includes multiple patient environments each having a different group of caregivers assigned thereto. As another illustrative example, the assignment module 212 adds all caregivers who are assigned to the patient P. As another illustrative example, the assignment module 212 adds all caregivers who are responsible for responding to a particular alarm condition. Additional examples of assigning the caregivers to the communications channel 208 are possible.

In some examples, the channel module 210 creates the communications channel 208 each time an alarm condition that requires immediate intervention by the caregivers C is detected inside the patient environment 12. In alternative examples, the communications channel 208 is predefined and remains deactivated or dormant until an alarm condition is detected. This can reduce time to open the communications channel, and speed up critical communications between the caregivers C in the clinical care environment 10. In some examples, the communications channel 208 is predefined by an administrator of the clinical care environment 10.

As an illustrative example, a communications channel is predefined for each patient environment in the clinical care environment or for each patient admitted to the clinical care environment. In a further illustrative example, a communications channel is predefined for a group of caregivers on shift in the clinical care environment 10. The communications server 112 automates the caregivers C joining the predefined communications channels. When no alarm condition is detected that requires an intervention, a predefined communications channel remains deactivated or closed. When an alarm condition is detected that requires an intervention, the predefined communications channel is activated or opened, and the communications server 112 automatically joins all assigned caregivers to the predefined communications channel.

Figure 3:
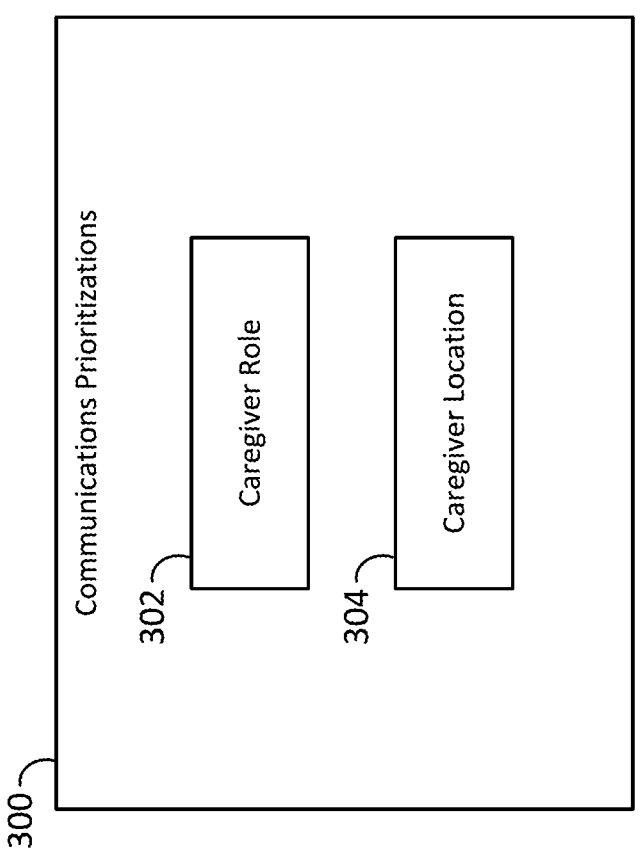
FIG. 3 schematically illustrates an example of communications priorities assigned to caregivers in the communications channel by the communications server of FIG. 2.

FIG. 3 schematically illustrates an example of communications priorities 300 assigned to the caregivers C in the communications channel 208 by the prioritization module 214. Referring now to FIGS. 1-3, when a caregiver C is given communications priority over other caregivers assigned to the communications channel 208, the caregiver is allowed to speak over the other caregivers in the communications channel. The prioritization module 214 can determine and assign communications priorities for the caregivers C based on a role 302 of each caregiver assigned to the communications channel 208, a location 304 of each caregiver assigned to the communications channel 208, or a combination of the role 302 and the location 304 of each caregiver assigned to the communications channel 208. Additional examples of communications priorities 300 that can be assigned to the caregivers C are possible.

Figure 4:
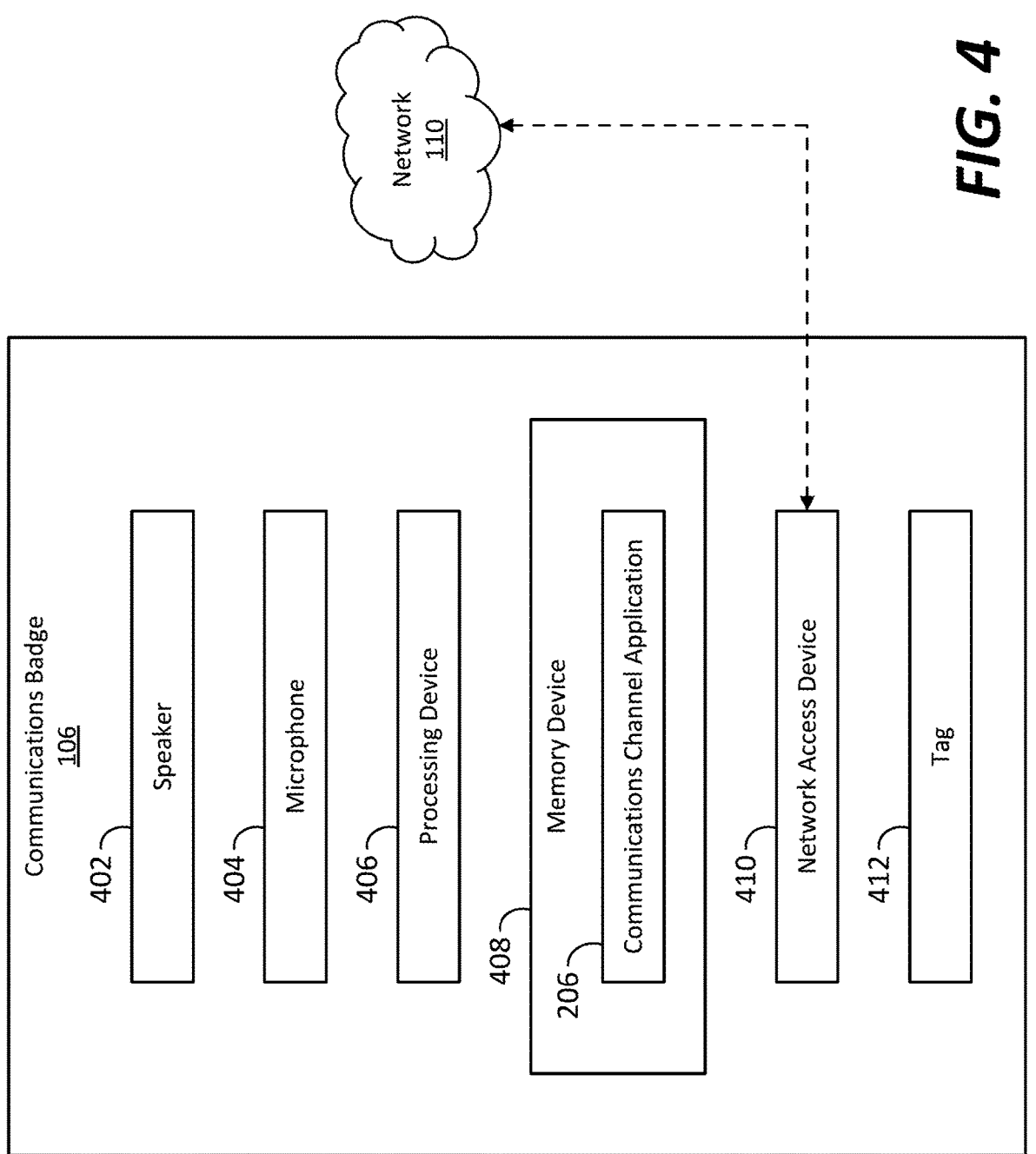
FIG. 4 schematically illustrates an example of a communications badge that can be worn by a caregiver in the clinical care environment of FIG. 1.

FIG. 4 schematically illustrates an example of a communications badge 106 that can be worn by a caregiver C in the clinical care environment 10. As shown in FIG. 4, the communications badge 106 includes a speaker 402 that converts audio signals transmitted over the network 110 into sound. The audio signals can include audio signals received from the other communications badges worn by the other caregivers in the clinical care environment 10.

The communications badge 106 also includes a microphone 404 that converts voice communications from the caregiver into electrical signals that can be transmitted over the network 110 to the other communications badges worn by the other caregivers in the clinical care environment 10. The communications badge 106 can further include a tag

412 that can be detected by the fixed reference point 114 inside the patient environment 12 (see FIG. 1).

The communications badge 106 further includes at least one processing device 406, a memory device 408, and a network access device 410, that can be similar to the at least one processing device 202, the memory device 204, and the network access device 216 of the communications server 112, described above. As shown in FIG. 4, the memory device 408 of the communications badge 106 can store a version of the communications channel application 206.

Referring now to FIGS. 1-4, the communications channel application 206 can activate the microphone 404 on the communications badge 106 worn by the caregiver C who has communications priority, and can deactivate the microphone 404 on the communications badges 106 worn by the other caregivers assigned to the communications channel 208. This can avoid scenarios where several caregivers in the communications channel 208 are talking at the same time, such that relevant and useful information from one caregiver is overlapped, muted, or otherwise ignored by other caregivers who are discussing less relevant or useful information.

As an illustrative example, the prioritization module 214 can assign a higher communications priority to a caregiver C who has a role 302 as a medical specialist trained to treat a specific alarm condition detected in the patient environment 12 over other caregivers who do not have such medical specialty or training. This communications priority ensures that the caregiver C who has the best training or skill set suited for treating an alarm condition detected in the patient environment 12 is able to speak over other caregivers who are joined in the communications channel 208 and who do not have such training or skills.

In another illustrative example, the prioritization module 214 can assign a higher communications priority to a caregiver C who has a location 304 determined by the RTLS 116 to be inside the patient environment 12 over other caregivers who have locations 304 determined by the RTLS 116 to be outside of the patient environment 12. This communications priority ensures that the caregiver C who is able to directly observe the patient P inside the patient environment 12 is able to speak over other caregivers who are located remotely away from the patient P.

In another illustrative example, the prioritization module 214 can assign communications priority to the caregiver C joined in the communications channel 208 based on a combination of role 302 and location 304 of the caregivers. For example, the prioritization module 214 can assign a higher communications priority to a caregiver C who has adequate training to treat an alarm condition and who is in closest proximity to the patient environment 12 such that the caregiver is able to speak over other caregivers who do not have adequate training and/or who are located farther away from the patient environment 12.

Figure 5:
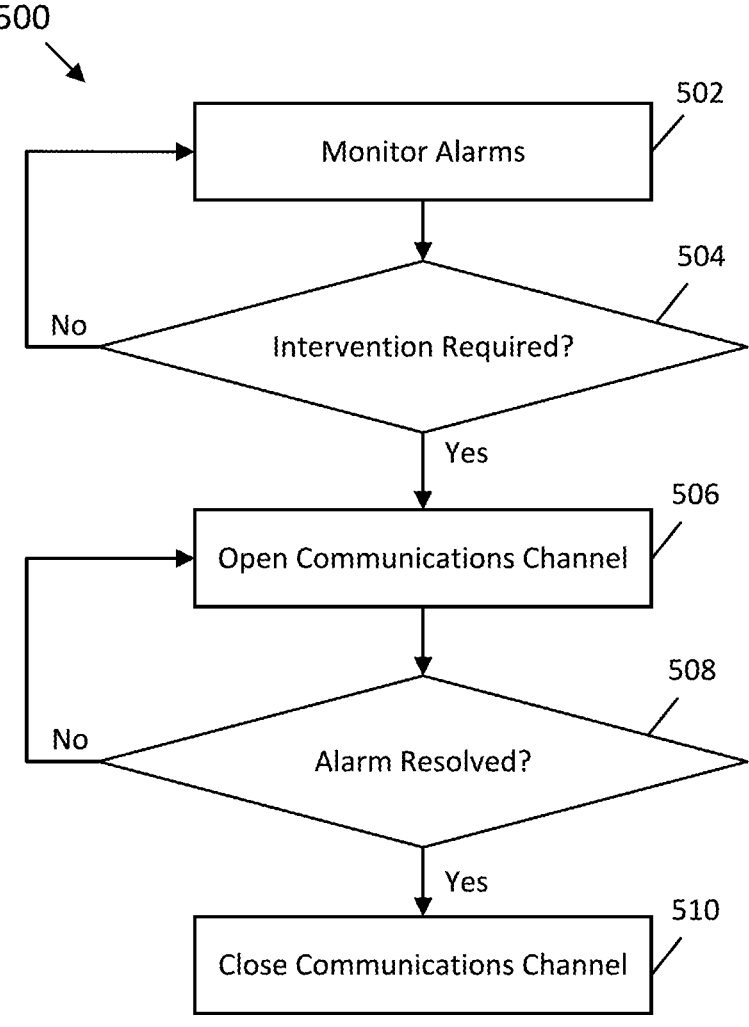
FIG. 5 schematically illustrates an example of a method of creating a communications channel based on an alarm condition inside the patient environment of FIG. 1.

FIG. 5 schematically illustrates an example of a method 500 of creating the communications channel 208 based on an alarm condition inside the patient environment 12. In accordance with the examples described above, the method 500 can be performed by the communications server 112 in communication with the communications badges 106 via the network 110. The method 500 includes an operation 502 of monitoring alarms inside the patient environment 12. For example, operation 502 can include receiving alarm notifications from one or more devices located inside the patient environment 12 such as the patient support apparatus 102 and the monitoring device 104, and receiving alarm notifications from the RTLS 116.

Next, the method 500 includes an operation 504 of determining whether an alarm notification requires an immediate intervention by a caregiver. As an illustrative example, operation 504 can include determining whether an immediate intervention by a caregiver is required based on a type of alarm condition or a severity of alarm condition detected in the patient environment 12. When the type of alarm condition or the severity of alarm condition does not require an immediate intervention by a caregiver (i.e., "No" in operation 504), the method 500 returns to operation 502 to continue monitoring alarms inside the patient environment 12.

When it is determined that an immediate intervention by a caregiver is required based on the type of alarm condition or the severity of alarm condition detected in the patient environment 12 (i.e., "Yes" in operation 504), the method 500 proceeds to an operation 506 of opening the communications channel 208. The operation 506 can include assigning caregivers to the communications channel 208 without requiring their consent to join, and assigning communication priorities to the caregivers in the communications channel 208.

Next, the method 500 includes an operation 508 of determining whether the alarm condition is resolved in the patient environment 12. When the alarm condition is not resolved (i.e., "No" in operation 508), the method 500 can return to operation 506 and continue maintaining open the communications channel 208. In some examples, maintaining open the communications channel 208 can include updating the communications priorities based on the relative locations of the caregivers in the clinical care environment 10. An illustrative example of updating the communications priorities will be described with reference to FIG. 6.

When the alarm condition is resolved (i.e., "Yes" in operation 508), the method 500 can proceed to an operation 510 of terminating the communications channel 208. In operation 510, the communications channel 208 is terminated without requiring any input or feedback from the caregivers C assigned to the communications channel 208. In one illustrative example, once the alarm that triggered the communications channel 208 is resolved, such as by a caregiver entering the patient environment 12 and resetting the alarm on the patient support apparatus 102 or monitoring device 104, the communications channel 208 is automatically terminated. In another illustrative example, the communications channel 208 is automatically terminated once the fixed reference point 114 detects that a caregiver has entered the patient environment 12.

In some examples, operation 510 can include storing a recording or a transcript of the communications channel 208 in a memory of the communications server 112 for further analysis. For example, the recording or transcript of the communications channel 208 can be analyzed to determine ways to improve response time to the alarm condition, or how to better allocate personnel and equipment resources for resolving the alarm condition. This analysis can help improve patient outcomes and satisfaction in the clinical care environment 10.

Figure 6:
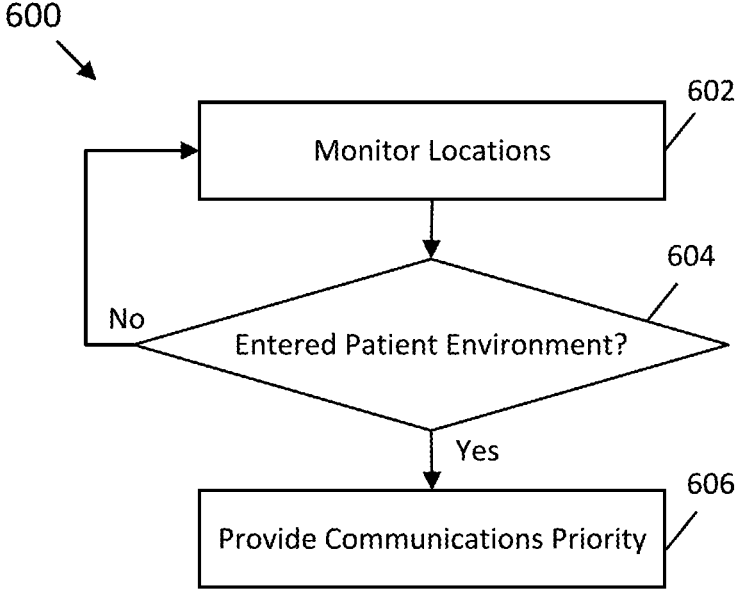
FIG. 6 schematically illustrates an example of a method of updating communications priorities in a communications channel generated by the communications server of FIG. 2.

FIG. 6 schematically illustrates an example of a method 600 of updating communications priorities in a communications channel generated by the communications server 112. The method 600 includes an operation 602 of monitoring the locations of the caregivers C in the clinical care environment 10. As described above, fixed reference points 114 can be distributed throughout the clinical care environment 10 allowing the RTLS 116 to track the locations of the patient P and the caregivers C in the clinical care environment 10.

Next, the method 600 includes an operation of 604 of determining whether a caregiver C has entered the patient environment 12. Operation 604 can include using the fixed reference point 114 inside the patient environment 12 (see FIG. 1) to detect a Bluetooth signal from a communications badge 106 worn by a caregiver C, and using the RTLS 116 to determine that the caregiver C entered the patient environment 12 based on the signal the RTLS 116 receives from the fixed reference point 114 over the network 110.

When the caregiver C is detected as having entered the patient environment 12 (i.e., "Yes" in operation 604), the method 600 proceeds to an operation 606 of providing the caregiver C with communications priority allowing the caregiver C to talk over other caregivers who are joined in the same communications channel and who have not entered the patient environment 12. Operation 606 can include activating the microphone 404 on the communications badge 106 worn by the caregiver who has communications priority, and deactivating the microphones 404 on the communications badges 106 worn by the other caregivers assigned to the communications channel 208 whenever it is detected that the caregiver with communications priority is speaking.

When a caregiver C is not detected as having entered the patient environment 12 (i.e., "No" in operation 604), the method 600 continues monitoring at operation 602 the locations of the caregivers C in the clinical care environment 10. In some examples, the method 600 can include providing communications priority based relative locations of the caregivers C in the clinical care environment. For example, a caregiver C who is in closest proximity to the patient environment 12 (even though they have not yet entered the patient environment 12) can be given communications priority over the other caregivers in the communications channel.

Figure 7:
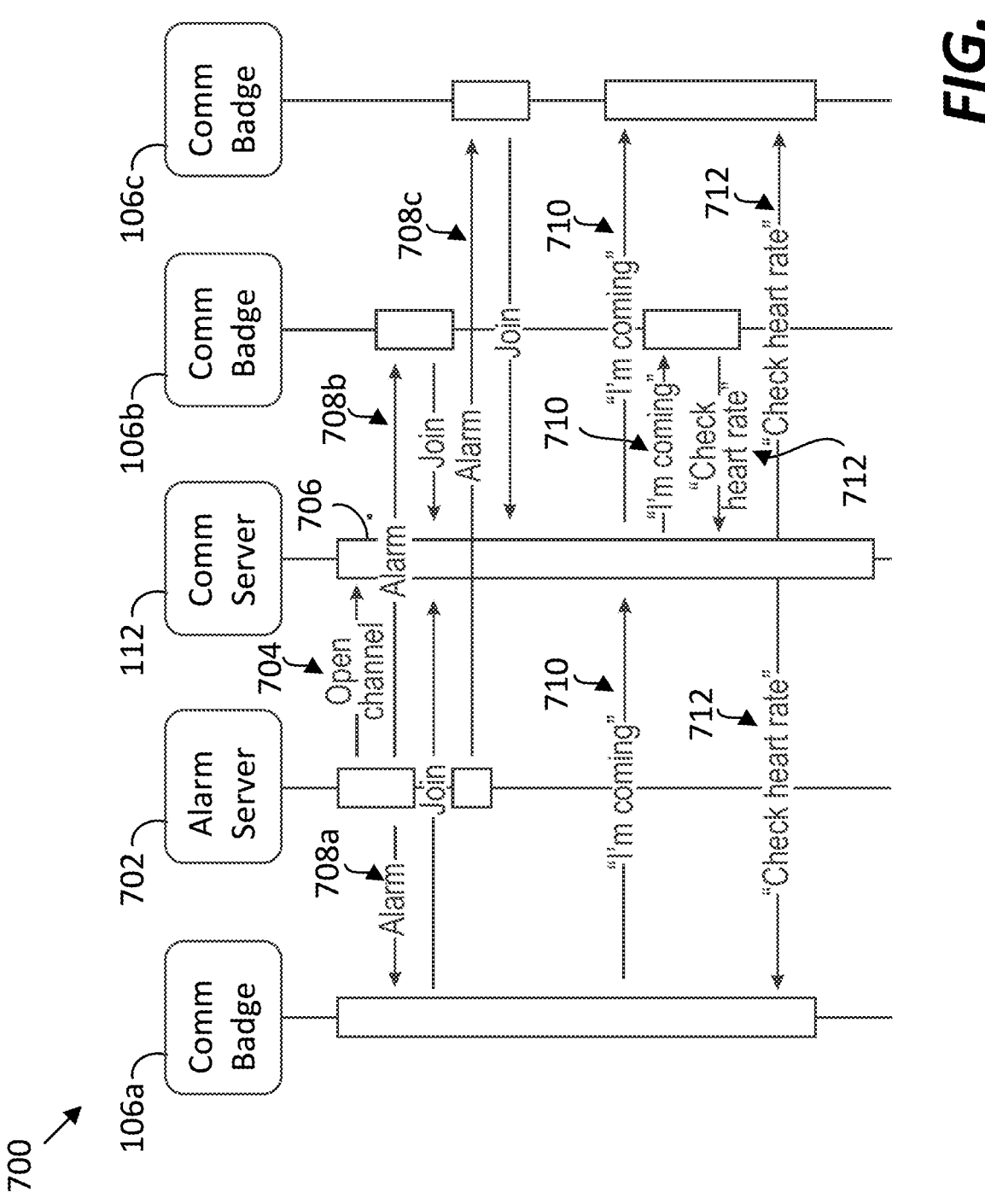
FIG. 7 schematically illustrates an example of a process flow diagram implemented in the clinical care environment of FIG. 1.

FIG. 7 schematically illustrates an example of a process flow diagram 700 implemented in the clinical care environment 10. As shown in FIG. 7, an alarm server 702 detects an alarm condition in the patient environment 12. The alarm server 702 detects an alarm condition from one or more devices in the patient environment 12 such as the patient support apparatus 102 and the monitoring device 104, or from one or more devices and systems outside of the patient environment 12 such as the RTLS 116. The alarm server 702 sends an instruction 704 to open a communications channel over the network 110 to the communications server 112.

In response to the instruction 704 received from the alarm server 702, the communications server 112 opens a communications channel 706. In some examples, the communications server 112 creates the communications channel 706 as a new communications channel. In alternative examples, the communications server 112 opens the communications channel 706 as a preexisting communications channel that was previously deactivated or dormant. In some examples, the preexisting communications channel is predefined by the clinical care environment 10 to have an assignment of caregivers based on the patient environment 12, the patient P, or the type of alarm condition detected by the alarm server 702.

The alarm server 702 transmits alarm notifications 708a, 708b to the communications badges 106a, 106b worn by the first and second caregivers C1, C2. Also, the communications server 112 automatically joins the communications badges 106a, 106b to the communications channel 706. In some examples, the communications server 112 joins the communications badges 106a, 106b to the communications channel 706 after the communications badges 106a, 106b receive the alarm notifications 708a, 708b from the alarm server 702. In other examples, the communications badges 106a, 106b simultaneously receive the alarm notifications 708a, 708b and join the communications channel 706 at the same time.

In the illustrative example of FIG. 7, the alarm server 702 transmits an alarm notification 708c to the communications badge 106c worn by the third caregiver C3. Thereafter, the communications server 112 joins the communications badge 106c to the communications channel 706. In some examples, the communications badge 106c simultaneously receives the alarm notifications 708c and joins the communications channel 706 at the same time.

In this example, the first caregiver C1 uses the microphone 404 on the communications badge 106a to broadcast a voice communication 710 (e.g., "I'm coming") that is received and relayed by the communications server 112 to the communications badges 106b, 106c of the second and third caregivers C2, C3. In certain examples, the first caregiver C1 can be provided communications priority by the prioritization module 214 of the communications channel application 206 installed on the communications server 112 based on a determination from the RTLS 116 that the first caregiver C1 is in closer proximity to the patient environment 12 than the second and third caregivers C2, C3. As discussed above, the communications priority allows the first caregiver C1 to talk over the second and third caregivers C2, C3 who are joined in the communications channel 706. For example, the communications priority can deactivate the microphones 404 on the communications badges 106b, 106c worn by the second and third caregivers C2, C3 whenever it is determined that the first caregiver C1 is speaking.

In the illustrative example of FIG. 7, the second caregiver C2 uses the microphone 404 on the communications badge 106b to broadcast a voice communication 712 (e.g., "Check heart rate") that is received and relayed by the communications server 112 to the communications badges 106a, 106c of the first and third caregivers C1, C3. In this manner, the first, second, and third caregivers can continue to communicate while the communications channel 706 remains open. Once the alarm server 702 determines the alarm condition is resolved, the communications server 112 automatically terminates the communications channel 706.

In some examples, a recording or a transcript of the communications channel 706 can be saved on the memory device 204 of the communications server 112 for further analysis, such as to determine ways to improve response time to the alarm condition, or how to better allocate personnel and equipment resources for resolving the alarm condition. This analysis can help improve patient outcomes and satisfaction in the clinical care environment 10.

The various embodiments described above are provided by way of illustration only and should not be construed to be limiting in any way. Various modifications can be made to the embodiments described above without departing from the true spirit and scope of the disclosure.

What is claimed is:

1. A system for providing alarm triggered communications, the system comprising:
   at least one processing device; and
   a memory device storing instructions which, when executed by the at least one processing device, cause the at least one processing device to:
   receive a notification regarding an alarm condition;

open a communications channel based on the alarm condition, the communications channel joining together communications badges worn by caregivers in a clinical care environment;

provide communications priority to one caregiver over other caregivers assigned to the communications channel, the communications priority allowing the one caregiver to speak over the other caregivers in the communications channel; and close the communications channel when the alarm condition is resolved.

2. The system of claim 1, wherein the instructions further cause the at least one processing device to:
   activate a microphone on a communications badge worn by the one caregiver having the communications priority; and
   deactivate microphones on communications badges worn by the other caregivers.

3. The system of claim 2, wherein the instructions further cause the at least one processing device to:
   broadcast a voice message from the communications badge worn by the one caregiver having the communications priority to the communications badges worn by the other caregivers.

4. The system of claim 1, wherein the instructions further cause the at least one processing device to:
   provide the communications priority based on a role, a location, or a combination of the role and the location of each caregiver joined in the communications channel.

5. The system of claim 1, wherein the instructions further cause the at least one processing device to:
   provide the communications priority by determining the one caregiver is located inside a patient environment, and the other caregivers are located outside the patient environment.

6. The system of claim 5, wherein determining the one caregiver is located inside the patient environment is based on a signal from a communications badge worn by the one caregiver detected by a fixed reference point inside the patient environment.

7. The system of claim 1, wherein the communications channel is opened without inviting the caregivers to accept or decline joining the communications channel.

8. The system of claim 1, wherein the instructions further cause the at least one processing device to:
   join the communications badges to the communications channel based on an assignment of the caregivers to an area where the alarm condition originates, or an assignment of the caregivers to a patient who triggers the alarm condition, or the alarm condition.

9. The system of claim 1, wherein the instructions further cause the at least one processing device to:
   store a recording or a transcript of the communications channel.

10. A method of providing alarm triggered communications, the method comprising:
    receiving a notification regarding an alarm condition;
    opening a communications channel based on the alarm condition, the communications channel joining together communications badges worn by caregivers in a clinical care environment;
    providing communications priority to one caregiver over other caregivers assigned to the communications channel, the communications priority allowing the one caregiver to speak over the other caregivers in the communications channel; and closing the communications channel when the alarm condition is resolved.

11. The method of claim 10, further comprising:

activating a microphone on a communications badge worn by the one caregiver having the communications priority; and deactivating microphones on communications badges worn by the other caregivers.

12. The method of claim 11, further comprising:

broadcasting a voice message from the communications badge worn by the one caregiver having the communications priority to the communications badges worn by the other caregivers.

13. The method of claim 10, further comprising:

providing the communications priority based on a role, a location, or a combination of the role and the location of each caregiver assigned to the communications channel.

14. The method of claim 10, further comprising:

providing the communications priority by determining the one caregiver is located inside a patient environment, and the other caregivers are located outside the patient environment.

15. The method of claim 14, wherein determining the one caregiver is located inside the patient environment is based on a signal from a communications badge worn by the one caregiver detected by a fixed reference point inside the patient environment.

16. The method of claim 10, further comprising:

joining the communications badges to the communications channel based on an assignment of the caregivers to an area where the alarm condition originates, an assignment of the caregivers to a patient who triggers the alarm condition, or the alarm condition.

17. The method of claim 10, further comprising:

storing a recording or a transcript of the communications channel.

18. A non-transitory computer readable storage medium storing instructions, which when executed by a computing device, cause the computing device to:

receive a notification regarding an alarm condition;

open a communications channel based on the alarm condition, the communications channel joining together communications badges worn by caregivers in a clinical care environment;

provide communications priority to one caregiver over other caregivers assigned to the communications channel, the communications priority allowing the one caregiver to speak over the other caregivers in the communications channel; and close the communications channel when the alarm condition is resolved.

\* \* \* \* \*